United States Patent

Purnell

[11] Patent Number: 5,147,558
[45] Date of Patent: Sep. 15, 1992

[54] ONE DRUM ACTIVATOR CATALYZED PAINT DETACKIFICATION PROGRAM

[75] Inventor: Deborah L. Purnell, Philadelphia, Pa.

[73] Assignee: Betz Laboratories, Inc., Trevose, Pa.

[21] Appl. No.: 751,945

[22] Filed: Aug. 29, 1991

Related U.S. Application Data

[63] Continuation-in-part of Ser. No. 590,910, Oct. 1, 1990, abandoned, which is a continuation-in-part of Ser. No. 388,435, Aug. 2, 1989, abandoned, which is a continuation-in-part of Ser. No. 327,846, Mar. 23, 1989, abandoned, which is a continuation-in-part of Ser. No. 161,866, Feb. 29, 1988, Pat. No. 4,853,132.

[51] Int. Cl.$^5$ ............................................. C02F 1/56
[52] U.S. Cl. ........................ 210/712; 55/85; 134/38; 210/728; 210/735; 210/736; 210/930; 252/181
[58] Field of Search .............. 55/85; 134/38; 210/702, 210/712, 723–728, 735, 736, 930; 252/180, 181; 427/331

[56] References Cited

U.S. PATENT DOCUMENTS

| | | | |
|---|---|---|---|
| 3,515,575 | 6/1970 | Arnold | 117/102 |
| 3,990,869 | 11/1976 | Forney | 55/19 |
| 4,067,806 | 1/1978 | Mauceri | 210/52 |
| 4,185,970 | 1/1980 | Dean | 55/89 |
| 4,220,456 | 9/1980 | Block | 55/85 |
| 4,440,647 | 4/1984 | Puchalski | 210/712 |
| 4,504,395 | 3/1985 | Harpel et al. | 210/712 |
| 4,564,464 | 1/1986 | Harpel et al. | 252/181 |
| 4,629,572 | 12/1986 | Leitz et al. | 210/714 |
| 4,637,824 | 1/1987 | Pominville | 210/728 |
| 4,656,059 | 4/1987 | Mizuno et al. | 427/345 |
| 4,686,047 | 8/1987 | Arots | 210/712 |
| 4,853,132 | 8/1989 | Merrell et al. | 210/728 |
| 5,015,391 | 5/1991 | Mohn | 210/736 |
| 5,024,768 | 6/1991 | Merrell | 210/728 |
| 5,060,682 | 10/1991 | Merrell | 210/736 |

*Primary Examiner*—Peter Hruskoci
*Attorney, Agent, or Firm*—Alexander D. Ricci; Gregory M. Hill

[57] ABSTRACT

In a paint spray booth wherein water is used to collect oversprayed paint, a process for detackifying and coagulating the oversprayed paint by the addition of specific amounts of specific anions and cationic polymers blended prior to addition to the water system.

4 Claims, No Drawings

ONE DRUM ACTIVATOR CATALYZED PAINT DETACKIFICATION PROGRAM

This is a continuation-in-part of Ser. No. 07/590,910 filed Oct. 1, 1990, now abandoned which is a continuation-in-part of Ser. No. 07/388,435, filed Aug. 2, 1989 now abandoned which is a continuation-in-part of Ser. No. 07/327,846 filed Mar. 23, 1989 (now abandoned), which is a continuation-in-part of Ser. No. 07/161,866, filed Feb. 29, 1988, now U.S. Pat. No. 4,853,132.

FIELD OF THE INVENTION

This invention relates to an improved method for treating paint wastes and paint oversprays encountered in wet paint spray booths or any areas where these oversprays exist.

BACKGROUND OF THE INVENTION

The spray painting of automobile bodies, truck engines, appliances, and other industrial goods is customarily carried out in enclosed areas called paint spray booths (PSB). These booths act to contain any fumes or oversprayed paint, to reduce the chances of airborne contamination and to protect the painters from these hazards. These booths vary in size, but are somewhat basic in their design and operation. A typical booth would thus consist of a work area, back section with mist eliminators and a sump.

The units to be painted generally pass through the work area while an air flow makes the oversprayed paint contact either the sump water or the spray from the water curtain. The air is scrubbed with recirculated water at the water curtain, passes through the mist eliminators and is removed by an exhaust fan.

Even though paint transfer efficiencies have increased through improved application technologies, roughly one-half of all paint sprayed does not reach its intended article. As a result, a significant concentration of paint builds in the system and agglomeration can occur. The result mass is a sticky, tacky material, which can plug the mist eliminators, shower heads, and even recirculating pumps. When this happens, scrubbing efficiency decreases, leading to potentially hazardous conditions of unchecked paint emissions being discharged into the atmosphere. Such conditions may also present severe safety hazards to paint spray booth operators.

This process involves other problems. These tacky organic deposits are subject to bacterial growth and fungi proliferation, which conditions generate corrosion and odor problems. In addition, the paint solids that are recirculated can form suspensions in the water. They remain tacky and can create expensive separation and disposal problems.

These problems show, therefore, the desirability to treat PSB water systems so as to reduce or prevent as much as possible the agglomeration and deposition of oversprayed paint on critical PSB operation parts, to render the resultant sludge non-tacky and easily removable and to provide a water quality such that it can be recycled for use in the system.

Another problem associated with paint detackification and separation from the paint spray booth water wash system is the disposal cost associated with removal of the resulting paint sludge. For economic reasons, it is highly desirable to provide a PSB chemical treatment that results in a high solids (low moisture) sludge with a reduced or low volume sludge so that disposal costs may accordingly be minimized.

RELEVANT ART

Many and varied chemical treatments have been proposed for detackifying the paint and providing a manageable sludge. For instance, in U.S. Pat. No. 3,515,575 (Arnold), it is suggested that the addition of at least 0.5 ppm of a water soluble polymer having repeat groups with the formula:

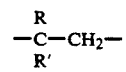

R = a hydrogen or methyl group
R' = an amide or carboxyl group to a paint spray booth wash water containing alkali, wetting agents, absorbents, and defoaming agents is effective at deactivating and collecting overspray paints.

This treatment approach was simplified in subsequent teachings. Examples include U.S. Pat. Nos. 3,990,869 (Forney), 4,067,806 (Mauceri), and 4,440,647 (Puchalski). These patents discuss the use of a variety of cationic polymers in conjunction with amphoteric metal salts and pH adjustment.

U.S. Pat. No. 4,686,047 (Arots) describes a cationic polymer treatment that does not require the use of amphoteric metal salts or other additives to achieve high performance and efficacy, as long as the pH is maintained above at least 6. Arots demonstrates the technique with polymer levels of 4–40%, based on overspray paint, at pH's adjusted to 10.

Similarly, U.S. Pat. No. 4,656,059 (Mizuno et al.) uses a colloidal solution of a melamine-aldehyde resin with pH adjustment to provide detackification. Other additives are suggested for improving the performance of the detackifier and for paint sludge handling (surface active agent for improving paint dispersibility and emulsifiability and a flocculant for improving solid-liquid separating properties). The treatment levels used in the examples are 0.1–5%, based on overspray paint.

As an improvement on Mizuno, U.S. Pat. No. 4,629,572 (Leitz et al.) incorporates the use of a water-swellable clay with colloidal solutions of urea or an amino triazine (melamine) aldehyde resin. Other patents which may be of interest include U.S. Pat. Nos. 4,185,970 (Dean), 4,220,456 (Block), 4,504,395 (Harpel et al.,), and 4,564,464 (Harpel et al.).

GENERAL DESCRIPTION OF THE INVENTION

The above and other problems in the field of paint spray booth chemical treatments are addressed by the present invention. It has been discovered that the combined use of specific inorganic anions and cationic polymers is effective at detackifying and conditioning overspray paint. More specifically the invention comprises a process for detackifying and coagulating hydrocarbon solvent (oil) based paint, lacquer, or enamel in spray booths in which water is used to wash air in said booth and to remove these oversprayed paints, enamels, or lacquers and wherein said water is recirculated for further washing the air in said spray booth. The inventive process comprises adding a composition comprised of a unitary blend of a water-soluble cationic polymer and a water soluble salt of an inorganic anion. The resultant blend detackifies and coagulates the paint, lacquer or enamel to provide a paint sludge that is high in solids and low in volume.

The effectiveness of the unitary blend of cationic polymer and anion can be determined by a simple procedure. The procedure entails the use of a number of test jars to which water and a definite concentration of cationic polymer have been added.

The testing is used to determine the most efficacious blend of polymer/inorganic anion. Blending may be performed either by the ultimate user of the treatment chemical, the supplier of the original constituents of the treatment chemicals or by any handler of these chemicals within the transport chain.

DETAILED DESCRIPTION OF THE INVENTION

The method according to the present invention comprises a paint spray booth detackification treatment program which effectively detackifies oil based paint, provides a paint sludge that is high in solids and low in volume, reduces or eliminates corrosion (i.e., the chlorides contained in Forney, Mauceri and Puchalski), contains no known hazardous ingredients (i.e., the residual free formaldehyde, a carcinogen, contained in Mizuno and Leitz) and is easy to apply and control).

It has been disclosed in U.S. Pat. No. 4,853,132, hereby incorporated by reference, that the use of specific inorganic anions, such as silicates, when combined with cationic polymers provides an improved composition and method for the detackification of paint wastes in a paint spray booth environment. According to this system, a selected inorganic anion and a cationic polymer are separately added to the recirculating wash water in the spray booth. In the water, the anion "activates" the polymer to form a precipitate which is responsible for detackification of the paint particles. Upon detackification, the anion is released from the cationic polymer, thereupon making it available for further activation of additional cationic polymers.

The anion is not consumed in the detackification process. However, other avenues of anion loss exist. These include loss with water removed from the system in the wet sludge, loss through reaction and precipitation with water hardness cations such as calcium and magnesium and loss with system blowdown or drift out the exhaust. These losses can be predicted and partially controlled.

In the commercialization of this technology, when silicate is used as the anion an unexpected high rate of silicate loss is experienced. This is caused by pH suppression resulting from $CO_2$ adsorption during aeration of the wash water. The solubility of silicate is strongly dependent on the pH of the solution. It is believed that an effective silicate can be formed by adding silica in another form (such as colloidal silica) and then raising the pH with additions of caustic. At typical use concentrations the solution is buffered by the silica to a pH of about 10.3. As the pH of the solution decreases, the concentration of silicate drops due to a corresponding reduction in the solubility of silica.

The unitary blend of the present invention allows the practitioner to calculate these anion losses and adjust the anion/cationic polymer blend ratio accordingly to maintain uniform anion levels throughout the treatment cycle. Flexibility of the blend ratio and consistency of the treatment product are key benefits of the invention. For example, if anion losses are calculated to be high, the practitioner may blend a composition consisting of an anion/cationic polymer ratio by weight of, for example, 4/1. Further treatments may require this ratio, or the amount of anion may be reduced if conditions permit. Other treatments, however, may allow for a lower ratio, such as 1/1. When using a 1 to 1 blend, since anion loss is substantially constant, it may be advisable to feed a separate amount of anion after the initial feed of the anion/cationic polymer detackifier. Thereafter, the 1 to 1 blend may be fed throughout the duration of the treatment.

Contemporary treatment programs require the separate addition of the anion and the cationic polymer into the spray booth wash water. Since a precipitate is formed upon the interaction of the anion and cationic polymer, these two species must therefore be fed independently. If combined prior to system feed, conventional wisdom holds that the precipitate would agglomerate to form a large, highly viscous mass, rendering the precipitate unmanageable and thereby making feeding it into the wash water nearly impossible. This would therefore have mitigated against preblending the anion and cationic polymer prior to system feed.

It is thought that the primary benefit of this program is that a novel chemical specie is formed, the thermodynamics (i.e., Gibbs free energy of formation) of which favors the reaction with live paint. This novel compound also precludes unreacted or "free" silica and polymer from reacting with extraneous materials in the PSB system such as water hardness and other chemical impurities. This, in turn, will adversely affect paint detackification and sludge handling.

In accordance with the present invention, it has been unexpectedly discovered that the blending of certain anions with specific cationic polymers into a single drum or other suitable container prior to addition to the wash water of the spray booth results in a stable formulation. The anion and the cationic polymer are blended in a ratio sufficient to provide optimum paint detackification from the resulting activated stable formulation in the drum or container. A stable blend is defined as one where no precipitate forms in the drum prior to treatment.

Furthermore, the addition of the treatment chemicals separately to the wash water generates other problems. Under the PSB systems treated by the various conventional programs, it is often necessary to feed the separate components at specific ratios to achieve desired results. For example, some systems require the immediate floatation of the detackified paint. Other systems, however, require that the sludge remain dispersed until it reaches a sludge separation unit. The dispersion or separation properties of the sludge are affected by variations in the ratio of anion to cationic polymer. It is an object of this invention to provide a paint detackification composition in a single drum which contains a consistently uniform pre-determined blend of anion activator and cationic polymer. The unitary blend treatment program encompassed by the present invention alleviates the problem of one or the other component being improperly fed causing an upset in the blend ratio.

Water soluble salts of the following anions, in particular the sodium, potassium and ammonium salts thereof, have been found to be particularly effective according to the present invention in providing the desired detackification and sludge conditioning results:

Metasilicate—$SiO_3^{2-}$
Orthosilicate—$SiO_4^{4-}$
Disilicate—$Si_2O_5^{-2}$

Mixed Silicates—$Na_2O \cdot xSiO_2$ (where x=3-5)
Metaaluminate—$AlO_2^-$
Aluminosilicates—$Na_2O \cdot xAl_2O_3 \cdot ySiO_2$ (where x+y=3-5)
Molybdates—$MO_7O_{24}^{-6}$
Phosphomolybdate—$(PO_4)2 \cdot 12MoO_3^{6-}$
Phosphates—$PO_4^{3-}$, $P_2O_7^{4-}$ The active water soluble cationic polymers of the present invention may be described as being of medium to low molecular weight, as having a high charge density, cross-linked or linear, condensation or addition polymers. The molecular weight range active in this invention may be between about 1,000 and 600,000 average molecular weight. The key criterion, however, is that the polymer is water soluble. The charge densities, as determined by the PVSK Colloid Titration Method (H. Terayama, Kayaku no Kenykya, Vol. 1, p. 75, 1948; H. Terayama, Kayakuno Kenkya, Vol. 4, p. 31, 1949; R. Senju, "Koroido Tekiteiho", Nankodo, Tokyo, 1969), are active in the range of about 1.5 to 12. meq/g active polymer.

The polymers, which have demonstrated the desired performance characteristics, are:

| Polymer | Description |
| --- | --- |
| I | Polydiallyl dimethyl ammonium chloride, such as CPS Chemical Company's Ageflex. |
| II | Condensation product of dimethylamine plus epichlorohydrin plus ethylene diamine, such as American Cyanamide Magnifloc 581C. |
| III | Condensation product of dimethylamine plus epichlorohydrin, such as described in U.S. Pat. No. 3,738,945 (Panzer & Dixson). |

In order to insure the stability of the two components of the invention, namely the cationic polymer and anion, it may be necessary to blend them in water. Incidentally, stability is defined herein as meaning that the blend of the cationic polymer and the anion do not precipitate or form a gel prior to addition to the PSB water system to be treated; they must remain in solution. The amount of water that may be required to make up the unitary blend of the invention may vary, but it will preferably be between 0 and 60% by weight.

The unitary blend consists of a cationic polymer and an anion in an aqueous solution. The cationic polymer is defined as comprising at least one of the cationic polymers shown above. The ratio of an anion to cationic polymer will depend on characteristics such as the charge of the target paint, the amount of paint in the PSB water system and the predicted loss of the anion due to the factors described above. Generally, the ratio of anion:cationic polymer will be from about 0.25:10 to about 10:1, by weight. The preferred range, however, is from 0.25:1 to 5:1.

Once the appropriate ratio of additives is determined and the unitary blend is prepared, it is ready to be added to the PSB water system. Addition is most often made to the water at the location of the sump. However, other locations throughout the recirculating water system may prove to be more desirable, depending on the design of the PSB water system. When treating any water system, it is often necessary to charge the system with an initial dosage of treatment chemicals. An initial charge of the unitary blend of the present invention may fall in the range of about 200 to 5000 ppm, based on weight.

As previously mentioned, the system to be treated may contain features or exhibit factors which would account for anionic loss. Accordingly, it would be necessary to supply more anionic species to the water in such systems. Such an objective may be achieved by two methods. First, an initial charge of the unitary blend containing a higher amount of anion may be added, followed by a continuous feed of a blend having a lower amount of anion. This is not preferred, however, because such a treatment would require mixing and transporting to the addition site two different unitary blends. For example, an initial charge of 4:1 blend of anion:cationic polymer may be required, followed by a 2:1 continuous feed blend. It is preferred, however, that in such situations an initial charge of anion be delivered along with the initial charge of the unitary blend. The dosage range of the anion may be from 0-3000 ppm by weight. After the initial charges are added the treatment should be continuously fed to the PSB water system in order to maintain a constant predetermined concentration of cationic polymer and anion. The amount of the unitary blend required is dependent upon the amount of paint present in the system. Therefore, the unitary blend is continuously fed as a percent, by weight, based on paint, conventionally known in the art as BOP. The continuous charge of the unitary blend is preferably in the range of 0.1-60% BOP, by weight, per minute. The advantage of using the same ratio of anion to cationic polymer for the initial charge and through the continuous feed is that only one batch of the unitary blend need be prepared and transported to the treatment site.

In the practice of the present invention it is necessary to determine the most stable blend ratio of anion to cationic polymer. Once an anion/cationic polymer pairing is determined to be efficacious for paint detackification, the proper blend ratio must be determined to assure stability of the formulation from the time it is blended in a drum or container until it is added to the wash water of a PSB system. The following table provides examples illustrative of the specific blend ratios required for efficacious (non-gelling) anion/cationic polymer pairings in contrast to some blends in which gelling occurs.

TABLE I

| Formulation | Weight % | Appearance |
| --- | --- | --- |
| Silicate[1] | 85.00 | Waxy paste |
| Polymer III | 11.25 | |
| Polymer I | 3.75 | |
| Silicate[1] | 50.00 | Slightly cloudy thin layer of separation |
| Polymer III | 7.50 | |
| Polymer I | 4.23 | |
| Water* | 40.00 | |
| Silicate[1] | 23.08 | Clear/Stable |
| Polymer III | 12.68 | |
| Polymer I | 4.23 | |
| Water* | 60.00 | |
| Silicate[1] | 50.00 | Clear/Stable |
| Polymer III | 5.00 | |
| Polymer II | 5.00 | |
| Water* | 40.00 | |
| Silicate[1] | 46.16 | Clear/Stable |
| Polymer III | 16.92 | |
| Polymer II | 16.92 | |
| Water* | 20.00 | |
| Silicate[1] | 25.00 | Clear/Stable |
| Polymer III | 12.50 | |
| Polymer II | 12.50 | |
| Water* | 50.00 | |
| Silicate[1] | 29.00 | Clear/Stable |
| Polymer III | 16.00 | |
| Polymer I | 5.00 | |
| Water* | 50.00 | |
| Silicate[1] | 46.00 | Gel |

TABLE I-continued

| Formulation | Weight % | Appearance |
|---|---|---|
| Polymer III | 17.00 | |
| Polymer II | 17.00 | |
| Zinc Sulfate | 5.00 | |
| Water* | 15.00 | |
| Silicate[1] | 46.00 | Gel |
| Polymer III | 17.00 | |
| Polymer II | 17.00 | |
| Aluminum sulfate | 5.00 | |
| Water* | 15.00 | |
| Silicate[1] | 46.00 | Gel |
| Polymer III | 17.00 | |
| Polymer II | 17.00 | |
| Ferric Chloride | 5.00 | |
| Water* | 15.00 | |
| Silicate[1] | 29.00 | Gel |
| Polymer III | 16.00 | |
| Polymer I | 5.00 | |
| Zinc Sulfate | 5.00 | |
| Water* | 45.00 | |
| Silicate[1] | 29.00 | Gel |
| Polymer III | 16.00 | |
| Polymer I | 5.00 | |
| Aluminum Sulfate | 5.00 | |
| Water* | 15.00 | |
| Silicate[1] | 29.00 | Gel |
| Polymer III | 16.00 | |
| Polymer I | 5.00 | |
| Ferric Chloride | 5.00 | |
| Water* | 15.00 | |
| Sodium Molybdate (35%) | 50.00 | Clear/Stable |
| Polymer III | 5.00 | |
| Polymer II | 5.00 | |
| Water* | 40.00 | |
| Sodium Molybdate (35%) | 50.00 | Clear/Stable |
| Polymer III | 7.50 | |
| Polymer I | 2.50 | |
| Water* | 40.00 | |
| Sodium Aluminate (22.5%) | 50.00 | Clear/Stable |
| Polymer III | 5.00 | |
| Polymer II | 5.00 | |
| Water* | 40.00 | |
| Sodium Aluminate (22.5%) | 50.00 | Clear/Stable |
| Polymer III | 7.50 | |
| Polymer I | 2.50 | |
| Water* | 40.00 | |
| Trisodium Phosphate (10%) | 50.00 | Clear/Stable |
| Polymer III | 5.00 | |
| Polymer II | 5.00 | |
| Water* | 40.00 | |
| Trisodium Phosphate (10%) | 50.00 | Clear/Stable |
| Polymer III | 7.50 | |
| Polymer I | 2.50 | |
| Water* | 40.00 | |

[1]Sodium Silicate with a SiO$_2$/Na$_2$O weight ratio of 2/1
*ordinary tap water The clear/stable blends from Table 1 were found to be stable not only at room temperature but also at 40° F. and 122° F.

The stability of the clear/stable blends over time demonstrates a surprising benefit of the invention. It was assumed that product efficacy would degrade with time because the presence of the caustic silicate would result in the hydrolysis of the cationic polymers. However, this does not occur. With the above formulations, they not only remained compositionally stable over a period of six months bu their efficacies as detackifiers remained unimpaired.

The treatment program of the present invention is compared with a well known conventional treatment program such as that which is described in Example 4 of U.S. Pat. No. 4,440,647 (Sample A, Table II). Results show the desirable non-gelling characteristic of the present treatment (Sample B, Table II) in contrast to the patented method which yields a useless gel when all treatment ingredients are blended together prior to addition to the water in a paint spray booth sump.

TABLE II

Stability of Conventional Treatments

| Sample | Formulation | Weight % | Appearance |
|---|---|---|---|
| A | Santofloc F* | 10.00 | Viscous gel |
| | Polyamine Epichlorohydrin | 4.70 | |
| | Zinc chloride | 8.00 | |
| | Sodium Silicate** | 10.00 | |
| | Water | 67.30 | |
| B | Polymer III | 21.64 | Clear/Stable |
| | Polymer I | 7.21 | |
| | Sodium Silicate*** | 21.15 | |
| | Water | 50.00 | |

*Condensation product of hexamethylenediame still bottoms plus ethylene dichloride
**Sodium metasilicate
***Sodium disilicate The formation of a gel in Example A rendered the mixture incapable of being tested for detackification and water clarity characteristics. Only the treatment composition according to the boundaries defined by the scope of the present invention was able to be tested. Once tested, this composition was proven to be very effective.

EXAMPLES

A standard jar test procedure is used to determine the functional dosage levels and proper combinations of cationic polymer and inorganic anion. The general procedure is to add 100 ml of tap water to a 120 ml jar. The pre-blended treatment is added, and the bottle capped and shaken to mix the contents and coat the internal surfaces of the jar with the treated water. One (1) ml of a high solids automotive base coat paint is added to the jar. After vigorous shaking for 30 seconds, a wooden tongue depressor is immersed in the solution and then removed for examination. The following guidelines are used for examining the detackification performance of the treatment.

| Rating | Definition |
|---|---|
| Fair | Paint forms large tacky globules and/or coating which adheres to the exposed surfaces of the jar and tongue depressor. |
| Poor | Paint forms agglomerates which are slightly tacky or smeary to touch, or upon crushing. Paint sludge coats the tongue depressor. |
| Fair | Paint forms granular flocs or globules which adhere to less than 10% of the exposed surface area of the jar or depressor. Sludge may be smeary, but not tacky. |
| Good | Paint forms particles or globules, some of which appear as specks on less than 1% of the exposed surface area of the jar or depressor. Sludge is neither smeary nor tacky. |
| Excellent | Paint forms particles which do not adhere to the exposed surfaces of the jar or depressor. The paint sludge may float, sink, or be dispersed in the water. |

Jar tests were performed to determine the efficacies of various blended treatments as compared to treatments where the individual components were fed separately to the system. Results are shown in Table III. Overall effectiveness is determined by water clarity (defined below) and paint kill (also defined below and based upon the rating system shown above).

TABLE III

Treatment Efficacy

| Treatment Samples | Unitary Blend | Ingredients+ | Concentration (ppm) | Paint Kill* | Clarity** |
|---|---|---|---|---|---|
| A | Yes | Anion/Cat 1 | 352/300 | 5 | 4 |
| B | Yes | Anion/Cat 2 | 352/300 | 5 | 3 |
| C | Yes | Anion/Cat 1 | 265/300 | 4-5 | 2 |
| D | Yes | Anion/Cat 2 | 265/300 | 4-5 | 2 |
| E | Yes | Anion/Cat 1 | 176/300 | 4-5 | 2 |
| F | Yes | Anion/Cat 2 | 176/300 | 4-5 | 2 |
| G | Yes | Anion/Cat 1 | 118/100 | 4-5 | 3 |
| H | Yes | Anion/Cat 2 | 118/100 | 4-5 | 3 |
| I | Yes | Anion/Cat 1 | 88/100 | 4 | 2 |
| J | Yes | Anion/Cat 2 | 88/100 | 4 | 3 |
| K | Yes | Anion/Cat 1 | 59/100 | 3 | 2-3 |
| L | Yes | Anion/Cat 2 | 59/100 | 2-3 | 2 |
| M | No | Anion/Cat 1 | 118/100 | 2-3 | 1-2 |
| N | No | Anion/Cat 2 | 118/100 | 2-3 | 1 |

+Cat (Cation) 1 = 50% Polymer III & 50% Polymer II
Cat (Cation) 2 = 75% Polymer III & 25% Polymer I
*Kill: 5 = excellent, 4 = good, 3 = fair, 2 = poor, 1 = fail
**Clarity: 5 = clear, 4 = slightly cloudy, 3 = cloudy, 2 = colored, 1 = turbid.

PILOT BOOTH TEST

To demonstrate the functional efficacy of the present invention, a blend was evaluated in a pilot Binks Center Well wet pain spray booth. Operating conditions are as follows:

Total water volume = 90 gallons
Flow at water curtain = 20 gallons/minute
Total paint loading = 2000 cc (5870.5 ppm)
Paint spray rate = 15 cc/minute An oil based semi-rigid red base coat and a semi-rigid clear coat were sprayed at 7.5 cc (22 ppm)/minute each. Initial charges of the treatments were added to the system prior to painting.

| | | |
|---|---|---|
| Formula Tested: | Silicate[1] | 46.16% |
| | Polymer II | 16.92% |
| | Polymer III | 16.92% |
| | Water | 20.00% |
| Initial Charge: | Formula | 900 ppm |
| | Silicate[1] | 1200 ppm |
| Continuous Feed: | Formula | 39% BOP |

[1]Sodium silicate having a SiO$_2$/Na$_2$O weight ratio of 2/1.
Results: Good paint kill and clear return water.

The unique feature of this invention is the surprising stability resulting from the combination of certain cationic polymers and anions at specific concentrations. Further, these stable blends are highly efficacious as paint detackifiers in paint spray booth water wash systems.

I claim:

1. In a paint spray booth containing water for collection of oversprayed paint, a process for detackifying and coagulating the oversprayed paint consisting essentially of adding to the water from 0.1 to 60%, based on paint, of a unitary blend comprising at least one cationic polymer selected from the group consisting of polydiallyl dimethyl ammonium chloride, a condensation product of dimethylamine plus epichlorohydrin plus ethylene diamine and a condensation product of dimethylamine plus epichlorohydrin, an inorganic anion selected from the group consisting of metasilicate, orthosilicate, disilicate, mixed silicate, metaaluminate, aluminosilicate, molybdate, phosphomolybdate and phosphate or the sodium, potassium or ammonium salts thereof wherein the weight ratio of inorganic anion to cationic polymer is between 0.25 to 10 and 10 to 1, and from about 20% to 60%, by weight, of water.

2. The process of claim 1 wherein the ratio, by weight, in the unitary blend of anion:cationic polymer is from about 0.25:1 to about 5:1.

3. The process of claim 1 wherein the oversprayed paint is an oil based paint.

4. The process of claim 1 further comprising an initial charge of from about 200 to 5000 ppm, by weight, of the unitary blend added to the water in the paint spray booth.

* * * * *